United States Patent
Kawamura et al.

(10) Patent No.: US 10,006,784 B2
(45) Date of Patent: Jun. 26, 2018

(54) ROTATIONAL ANGLE DETECTING DEVICE

(71) Applicant: DENSO CORPORATION, Kariya, Aichi-pref. (JP)

(72) Inventors: Takuya Kawamura, Kariya (JP); Hirofumi Kinjou, Nishio (JP); Toru Wakimoto, Nishio (JP); Hideaki Nakayama, Kariya (JP); Masataka Yoshimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 111 days.

(21) Appl. No.: 15/061,297

(22) Filed: Mar. 4, 2016

(65) Prior Publication Data

US 2016/0265942 A1 Sep. 15, 2016

(30) Foreign Application Priority Data

Mar. 11, 2015 (JP) ................. 2015-048622

(51) Int. Cl.
 G01B 7/00 (2006.01)
 G01R 33/025 (2006.01)
 G01D 5/14 (2006.01)
 G01D 3/036 (2006.01)

(52) U.S. Cl.
 CPC ........... G01D 5/145 (2013.01); G01D 3/0365 (2013.01)

(58) Field of Classification Search
 CPC ............................ G01D 5/145; G01D 3/0365
 USPC ........................ 324/207.12, 207.25
 See application file for complete search history.

(56) References Cited

U.S. PATENT DOCUMENTS

| | | | | |
|---|---|---|---|---|
| 2012/0031697 | A1* | 2/2012 | Matsuda | H02K 29/08 180/446 |
| 2013/0285591 | A1* | 10/2013 | Suzuki | H02P 25/22 318/724 |
| 2016/0202087 | A1* | 7/2016 | Kadoike | G01B 7/30 324/207.12 |

FOREIGN PATENT DOCUMENTS

JP 4783752 B2 9/2011

* cited by examiner

*Primary Examiner* — Reena Aurora
(74) *Attorney, Agent, or Firm* — Oliff PLC

(57) ABSTRACT

A correction circuit stores data for obtaining coefficients of a relational expression indicating a relationship between a disturbance magnetic flux and a rotational angle error. Then, the coefficients are obtained from the data for obtaining coefficients, and a detection result of a magnetic sensor is corrected based on the coefficients obtained, a relational expression, and a detection result of a disturbance magnetic flux detection circuit. Since it is possible to obtain the rotational angle error with respect to the disturbance magnetic flux from the coefficient obtained and the relational expression, it is not necessary to store the data indicating the relationship between the disturbance magnetic flux and the rotational angle error for all of the disturbance magnetic flux value in disturbance magnetic flux regions that may be applied.

12 Claims, 3 Drawing Sheets

ROTATIONAL ANGLE DETECTING DEVICE

CROSS-REFERENCE TO RELATED APPLICATION

This application is based on and claims the benefit of priority from earlier Japanese Patent Application No. 2015-48622 filed Mar. 11, 2015, the description of which is incorporated herein by reference.

TECHNICAL FIELD

The present disclosure relates to a rotational angle detecting device provided with a correction circuit for correcting detection results.

BACKGROUND

Conventionally, there is a resolver disclosed in Japanese Patent No. 4,783,752, for example, as a rotational angle detecting device provided with a correction circuit for correcting detection results.

The resolver includes a PROM, a correction coefficient calculating section, and a correcting section.

Here, the PROM, the correction coefficient calculating section, and the correcting section correspond to the correction circuit.

The resolver is a device that detects a rotational angle of a rotational shaft of a motor.

The resolver is mounted on the rotational shaft of the motor.

Meanwhile, when a current flows through the motor, there may be a magnetic flux leaking from the rotational shaft.

As a result, the leaked magnetic flux is applied to the resolver as a disturbance magnetic flux, and the detection result of the resolver may be changed.

In other words, a rotational angle error occurs.

In order to correct the rotational angle error, data indicating a relationship between the disturbance magnetic flux and the rotational angle error is stored in the PROM.

Specifically, data indicating a relationship between the current flowing through the motor and the rotational angle error is stored in the PROM.

The correction coefficient calculating section calculates a correction factor based on the data stored in the PROM and the detected current flowing through the motor.

The correcting section corrects the detection result of the resolver based on the correction coefficient that the correction coefficient calculating section has calculated, and outputs a rotational angle of the rotational shaft.

Thus, it is possible to suppress a rotational angle error caused by the disturbance magnetic flux being applied from occurring.

Incidentally, in the resolver described above, in order to correct the rotational angle error, it is necessary to store the data representing the relationship between the current flowing through the motor and the rotational angle error.

The current flowing through the motor variously changes in a predetermined current region.

Therefore, the data representing the relationship between the current flowing in the motor and the rotational angle error must be stored for all of the current in the current region.

In other words, the data indicating a relationship between the disturbance magnetic flux and the rotational angle error applied to the resolver for all the disturbance magnetic flux in disturbance magnetic flux regions that may be applied must be stored.

Therefore, volume of data to be stored becomes enormous. As a result, an enormous storage region is required. In addition, it takes time and effort to prepare data.

SUMMARY

An embodiment provides a rotational angle detecting device that can suppress a rotational angle error caused by a disturbance magnetic flux being applied from occurring while reducing a volume of data to be stored therein.

A rotational angle detecting device in a first aspect includes a magnet, disposed on a rotational shaft of a rotating body, which rotates together with the rotational shaft to generate a magnetic flux, a magnetic sensor disposed at a distance from the magnet for detecting the magnetic flux that interlinks with the magnetic sensor, a disturbance magnetic flux detection circuit that detects a disturbance magnetic flux interlinking to a magnetic flux that is a flux excluding a magnetic flux generated by the magnet, and a correction circuit that corrects a detection result of the magnetic sensor based on a detection result of the disturbance magnetic flux detection circuit.

The correction circuit stores at least either one of data for obtaining coefficients of a relational expression indicating a relationship between the disturbance magnetic flux and the rotational angle error, and a data of the coefficients.

The correction circuit corrects the detection result of the magnetic sensor based on at least either one of the data of the coefficients obtained from the data for obtaining the coefficients and the data of the coefficient stored, the relational expression, and the detection result of the disturbance magnetic flux detection circuit.

According to the present configuration, it is sufficient only to store at least either one of the data for obtaining the coefficients of the relational expression indicating the relationship between the disturbance magnetic flux and the rotational angle error, and the data of the coefficients.

Since it is possible to obtain the rotational angle error with respect to the disturbance magnetic flux from at least either one of the data of the coefficient obtained and the data of the coefficient stored, and the relational expression, it is not necessary to store the data indicating the relationship between the disturbance magnetic flux and the rotational angle error for all values of the disturbance magnetic flux in the disturbance magnetic flux regions that may be applied.

Therefore, it is possible to suppress the rotational angle error caused by the disturbance magnetic flux being applied from occurring while reducing the volume of data to be stored.

DETAILED DESCRIPTION OF THE PREFERRED EMBODIMENTS

The present disclosure will be described in more detail with embodiments.

In the present embodiment, an example of applying a rotational angle detecting device according to the present disclosure to a rotational angle detecting device for detecting a rotational angle of a motor in a motor drive system is shown.

First Embodiment

First, a configuration of a motor in a first embodiment will be described with reference to FIGS. 1 and 2.

Figure 1:
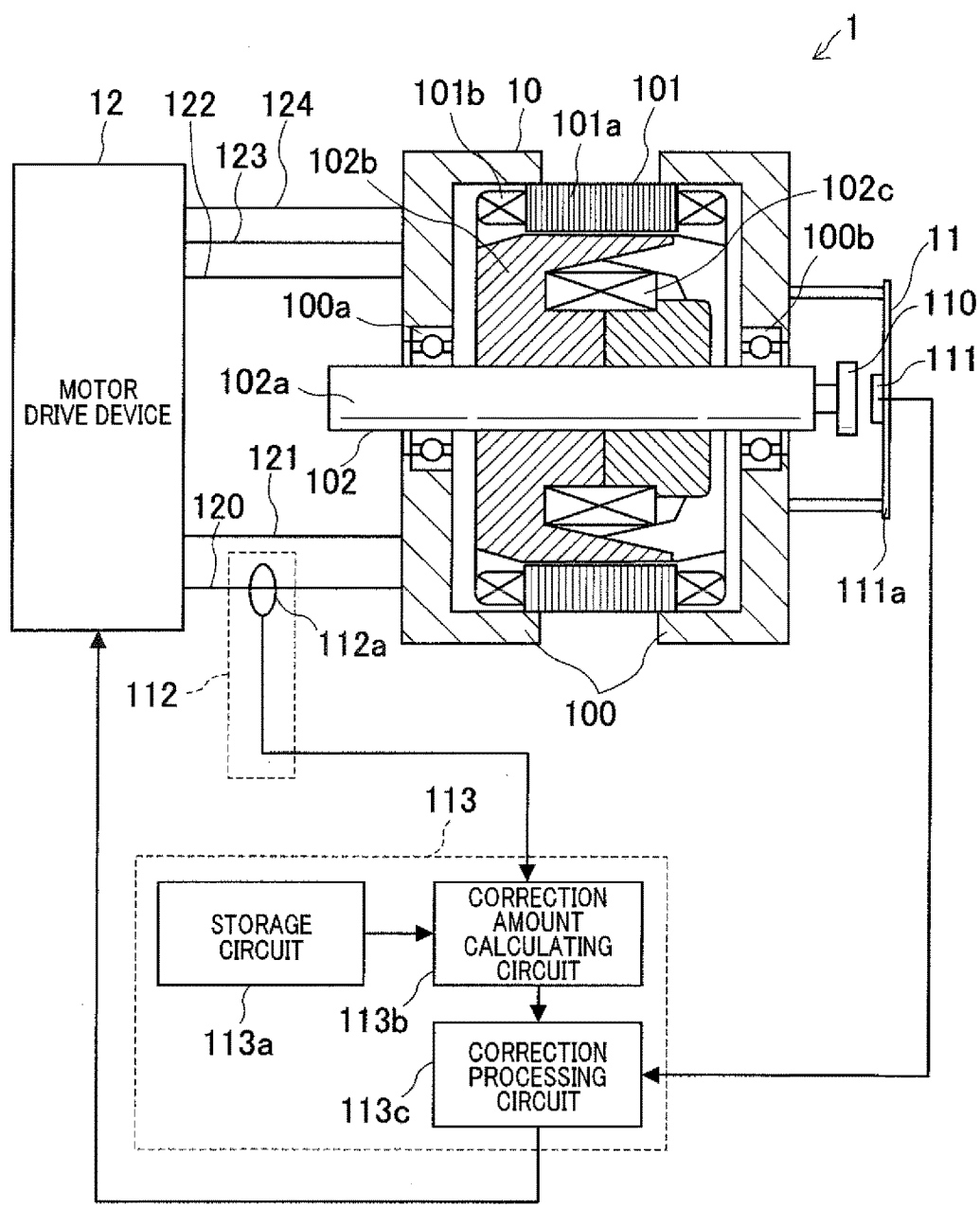
FIG. 1 shows a circuit diagram of a motor drive system according to a first embodiment.

A motor drive system 1 shown in FIG. 1 is a system that generates torque by driving a motor.

The motor drive system 1 includes a motor 10, a rotational angle detecting device 11, and a motor drive device 12.

The motor 10 is a device that generates a torque by a current flowing through the motor 10. Motor 10 includes a housing 100, a stator 101, and a rotor 102.

The housing 100 accommodates the stator 101 and the rotor 102, and as well as is a member that rotatably supports the rotor 102. The housing 100 is provided with bearings 100a, 100b.

The stator 101 is a member that constitutes a part of a magnetic path, as well as generating a magnetic flux by a three-phase alternating current being supplied, and forms a rotating magnetic field.

The stator 101 includes a stator core 101a and a stator winding 101b.

The stator core 101a is a cylindrical member made of a magnetic material that constitutes another part of the magnetic path, and supports the stator winding 101b.

The stator core 101a includes a plurality of slots (not shown) for accommodating the stator winding 101b.

The stator core 101a is fixed to an inner peripheral surface of the housing 100.

The stator winding 101b is a member that generates the magnetic flux by the three-phase alternating current being supplied, and forms the rotating magnetic field.

The stator winding 101b is accommodated in the slots of the stator core 101a, and is supported.

The rotor 102 is a member that constitutes another part of the magnetic path, as well generates the magnetic flux by the direct current being supplied, and forms magnetic poles.

The rotor 102 includes a rotational shaft 102a, a rotor core 102b, and a field winding 102c.

The rotational shaft 102a is a columnar member made of a ferromagnetic material.

The rotational shaft 102a is rotatably supported by the housing 100 via the bearings 100a, 100b.

The rotor core 102b is a member made of a ferromagnetic material constitutes another part of the magnetic path, as well as supports the field winding 102c.

The rotor core 102b is a so-called Lundell-type pole core.

The rotor core 102b is fixed to the rotational shaft 102a in a state where an outer peripheral surface thereof being opposed to an inner peripheral surface of the stator core 101a, and is rotatably supported by the housing 100.

The field winding 102c is a member that generates the magnetic flux by a direct current being supplied through a collector rings (not shown), and forms the magnetic poles in the rotor core 102b.

The field winding 102c is wound on the rotor core 102b cylindrically.

The rotational angle detecting device 11 is a device that detects a rotational angle of the rotational shaft 102a.

The rotational angle detecting device 11 includes a magnet 110, a magnetic sensor 111, a disturbance magnetic flux detection circuit 112, and a correction circuit 113.

Magnet 110 is a disk-shaped member that generates the magnetic flux.

Of a circular surface of the magnet 110, an N pole is formed on one of semicircular portions and an S pole is formed on another one of semicircular portions.

The magnet 110 is fixed to an end of the rotational shaft 102a in a state where a center of the circle is matched with an axis C of the rotational shaft 102a.

The magnetic sensor 111 is an element that detects the magnetic fluxes interlinking in a predetermined direction.

Specifically, the magnetic sensor 111 is the element that detects the interlinked magnetic flux in a direction perpendicular to a thickness direction, and outputs a signal corresponding to a detection result.

The magnetic sensor 111 is disposed at a distance from the magnet 110 in a state of being mounted on a circuit board 111a.

The magnetic sensor 111 is disposed such that a thickness direction thereof is along with the axial direction of the rotational shaft 102a, as well as a center thereof coincides with the axis C of the rotational shaft 102a.

An output of the magnetic sensor 111 is connected to the correction circuit 113.

The disturbance magnetic flux detection circuit 112 is a circuit that detects a disturbance magnetic flux that interlinks with the magnetic sensor 111, which is a magnetic flux other than the magnetic flux generated by the magnet 110.

When a current flows to the field winding 102c of the motor 10, the magnetic flux is generated.

Since the rotational shaft 102a is made of a magnetic material, a part of the generated magnetic flux may leak from an end of the rotational shaft 102a in the magnet 110 side to outside the motor 10.

The disturbance magnetic flux detection circuit 112 is a circuit that detects a leaked magnetic flux leaking from the end of the rotational shaft 102a in the magnet 110 side to outside the motor 10 as a disturbance magnetic flux among the magnetic flux generated by the current flowing through the field winding 102c.

The leaked magnetic flux, which is a disturbance magnetic flux, changes according to the current flowing through the field winding 102c.

The disturbance magnetic flux detection circuit 112 is, specifically, a circuit that detects a current flowing through the field winding 102c that has a corresponding relationship with the leaked magnetic flux, which is a disturbance magnetic flux.

The disturbance magnetic flux detection circuit 112 includes a current sensor 112a.

The current sensor 112a is an element that detects the current flowing through the field winding 102c.

The current sensor 112a is disposed in a state of being clamped to a wiring 120, which will be described later, that connects the motor drive device 12 and the field winding 102c.

An output of the current sensor 112a is connected to the correction circuit 113.

The correction circuit 113 is a circuit that corrects the detection result of the magnetic sensors 111 based on the detection result of the disturbance magnetic flux detection circuit 112.

Specifically, in a case where a relationship between the disturbance magnetic flux and a rotational angle error is represented by a single linear expression, the correction circuit 113 stores data for obtaining coefficients of a relational expression indicating the relationships between the disturbance magnetic flux and the rotational angle error in every rotational angle.

Further, the correction circuit 113 is a circuit that corrects the detection result of the magnetic sensor 111 based on the coefficient data obtained from the data for obtaining the coefficients and the detection result of the disturbance magnetic flux detection circuit 112.

Figure 2:
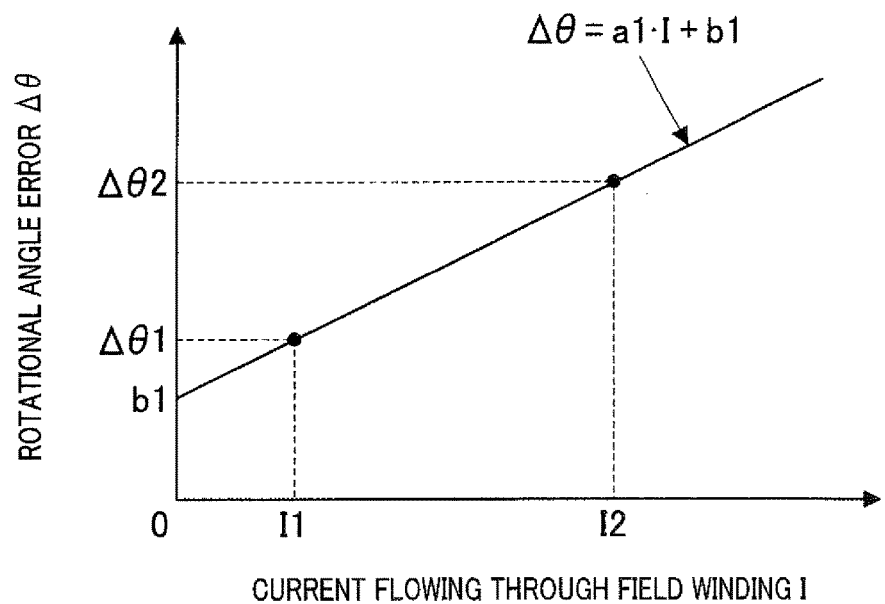
FIG. 2 shows an explanatory graph for explaining a relationship between a current flowing through a field winding and a rotational angle error.

As shown in FIG. 2, when a relationship between a current I flowing through the field winding 102c, which has a corresponding relationship with the disturbance magnetic flux, and a rotational angle error $\Delta\theta$ is represented by a single linear expression $\Delta\theta = a1 \cdot I + b1$, the correction circuit 113 stores two sets of data (I1, $\Delta\theta1$) and (I2, $\Delta\theta2$) for obtaining a slope a1 and an intercept b1, which are coefficients of the linear expression, in every rotational angle.

Here, the data (I1, $\Delta\theta1$) and (I2, $\Delta\theta2$) are two different currents I1, I2 flowing in the field winding 102c and two rotational angular errors $\Delta\theta1$, $\Delta\theta2$ corresponding to the currents I1, I2.

The data (I1, $\Delta\theta1$) and (I2, $\Delta\theta2$) are obtained beforehand by at least either one of experiments and simulations.

The correction circuit 113 obtains the slope a1 and the intercept b1 from the data for obtaining the coefficients of the linear expression (I1, $\Delta\theta1$) and (I2, $\Delta\theta2$).

Then, the correction circuit 113 corrects the detection result of the magnetic sensors 111 based on the linear expression obtained by substituting the obtained slope a1 and the intercept b1, and the current flowing through the field winding 102c detected by the current sensor 112a.

As shown in FIG. 1, the correction circuit 113 includes a storage circuit 113a, a correction amount calculating circuit 113b, and a correction processing circuit 113c.

The storage circuit 113a is a circuit that stores the two sets of data for obtaining the slope and the intercept of the linear expression shown in FIG. 2 in every rotational angle.

As shown in FIG. 1, an output of the storage circuit 113a is connected to the correction amount calculating circuit 113b.

The correction amount calculating circuit 113b is a circuit that obtains the slope and the intercept from the two sets of data for obtaining the slope and the intercept of the linear expression that are stored in the storage circuit 113a in every rotational angle.

Further, the correction amount calculating circuit 113b is a circuit that obtains the rotational angle error from the linear expression obtained by substituting the slope and the intercept that are obtained and the current flowing in the field winding 102c detected by the current sensor 112a, and calculates the correction amount for eliminating the rotational angle error.

The output of the current sensor 112a and the output of the storage circuit 113a are connected to an input of the correction amount calculating circuit 113b, and an output of the correction amount calculating circuit 113b is connected to the correction processing circuit 113c.

The correction processing circuit 113c is a circuit that corrects the detection result of the magnetic sensor 111 based on a calculation result of the correction amount calculating circuit 113b, and outputs to the motor drive device 12 as a rotational angle of the rotational shaft 102a.

The output of the input correction amount calculating circuit 113b and the output of the magnetic sensor 111 are connected to an input of the correction processing circuit 113c, and an output of the correction processing circuit 113c is connected to the motor drive device 12.

The motor drive device 12 is a device that supplies the direct current to the field winding 102c for driving the motor 10, and supplies the three-phase alternating current to the stator winding 101b based on the rotational angle inputted from the correction processing circuit 113c.

The output of the correction processing circuit 113c is connected to the input of the motor driving unit 12, a DC output of the motor driving unit 12 is connected to the field winding 102c via the wirings 120, 121 and the slip rings, and a AC output of the motor driving unit 12 is connected to the stator winding 101b via the wirings 122-124.

Next, operations of the motor drive system of the first embodiment will be described with reference to FIGS. 1 to 4.

The magnet 110 shown in FIG. 1 generates the magnetic flux.

Figure 3:
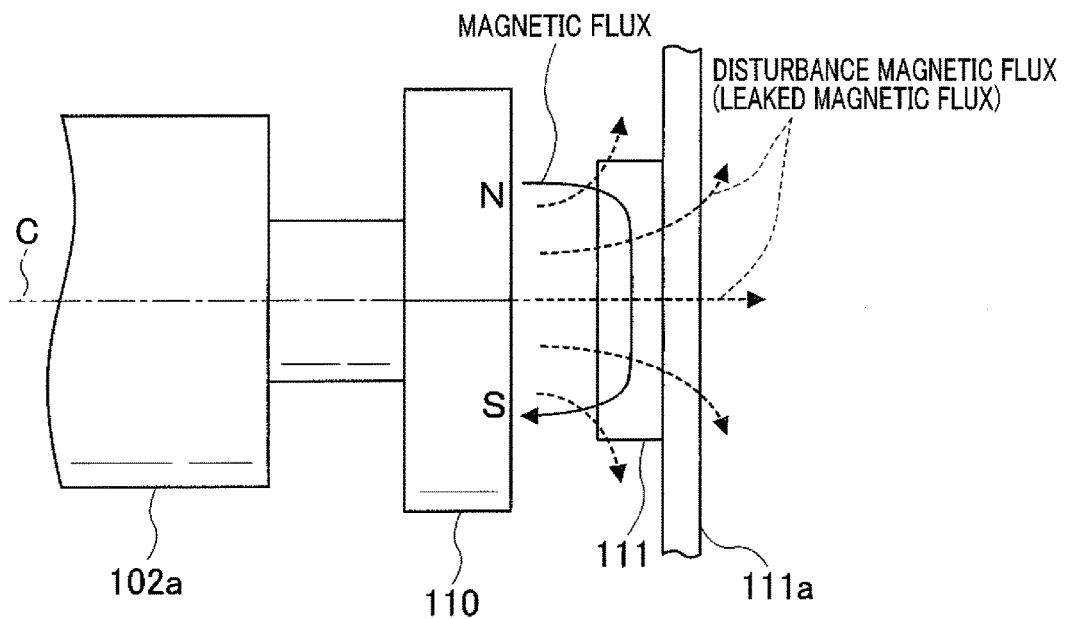
FIG. 3 shows an enlarged view near a magnetic sensor shown in FIG. 1 for explaining a flow of magnetic fluxes around the magnetic sensor.

As shown in FIG. 3, the magnetic flux generated by the magnet 110 flows from the N pole formed on one of the semicircular portions of the circular surface of the magnet 110 toward the S pole formed on the other one of the semicircular portions of the circular surface.

Therefore, the magnetic flux interlinks with the magnetic sensor 111 in a direction perpendicular to the thickness direction of the magnetic sensor 111.

The disturbance magnetic flux generated by the current flowing through the field winding 102c flows from the end of the rotational shaft 102a in the magnet 110 side toward the other end.

When the magnetic sensor 111 is disposed such that the center thereof coincides with the axis C of the rotational shaft 102a, the disturbance magnetic flux does not interlink with the magnetic sensor 111 in the direction perpendicular to the thickness direction.

Therefore, only the magnetic flux interlinks with the magnetic sensor 111 in the direction perpendicular to the thickness direction.

However, even if the magnetic sensor 111 is attempted to be disposed such that the center thereof coincides with the axis C of the rotational shaft 102a, a positional deviation occurs practically.

Figure 4:
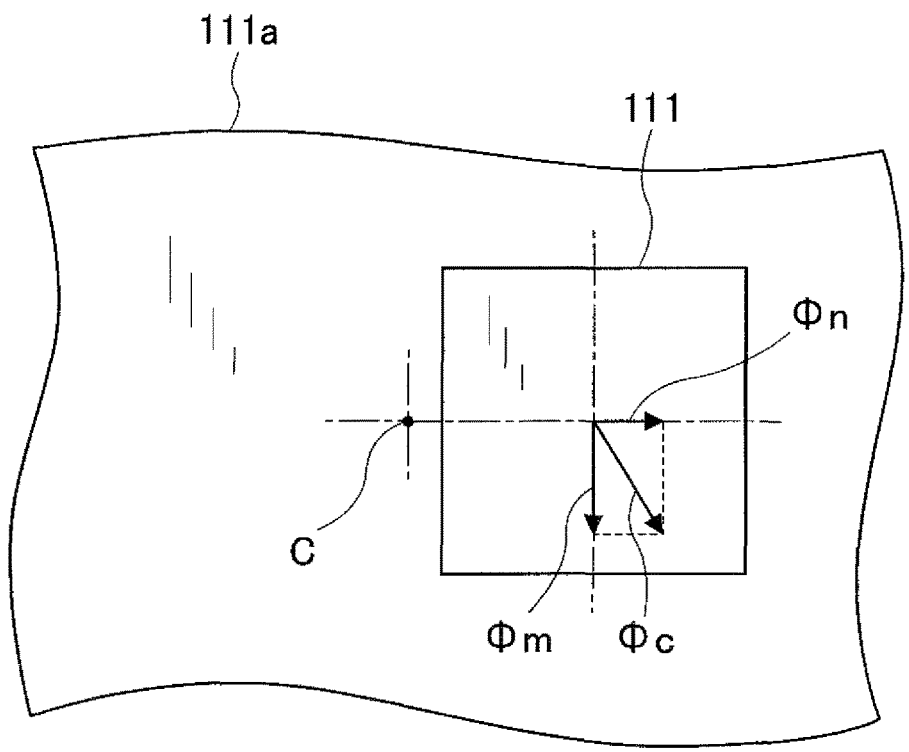
FIG. 4 shows a plan view of the magnetic sensor in FIG. 3 as viewed from a magnet side for explaining the magnetic flux that interlinks with the magnetic sensor.

As shown in FIG. 4, when the center of the magnetic sensor 111 is disposed at a position deviated from the axis C of the rotational shaft 102a, the disturbance magnetic flux becomes interlinked to the magnetic sensor 111 in the direction perpendicular to the thickness direction.

Thereby, the magnetic sensor 111 regards a synthetic magnetic flux $\Phi c$ of the magnetic flux $\Phi m$ that interlinks in the direction perpendicular to the thickness direction and the disturbance magnetic flux $\Phi n$ as a magnetic flux interlinking in the direction perpendicular to the thickness direction.

Therefore, the rotational angle error is generated by the disturbance magnetic flux.

The current sensor 112a shown in FIG. 1 detects the current flowing through the field winding 102c of the motor 10.

The correction amount calculating circuit 113b obtains the slope and the intercept of two sets of the data for obtaining the slope and intercept of the linear expression shown in FIG. 1 that is stored in the storage circuit 113a in every rotational angle.

Then, the correction circuit 113 obtains the rotational angle error from the linear expression obtained by substituting the slope and the intercept that are obtained and the current flowing in the field winding 102c detected by the current sensor 112a, and calculates the correction amount for eliminating the rotational angle error.

The correction processing circuit 113c shown in FIG. 1 corrects the detection result of the magnetic sensor 111 based on the calculation result of the correction amount calculating circuit 113b, and outputs it to the motor drive device 12 as the rotational angle of the rotational shaft 102a.

As a result, it is possible to make the rotational angle error almost zero.

The motor drive device 12 supplies the direct current to the field winding 102c for driving the motor 10, and supplies the three-phase alternating current to the stator winding 101b based on the rotational angle inputted from the correction processing circuit 113c.

As a result, the motor 10 generates a torque.

Next, effects of the motor drive system in the first embodiment will be described.

According to the first embodiment, the correction circuit 113 stores data for obtaining the coefficients of the relational expression indicating the relationship between the disturbance magnetic flux and the rotational angle error.

Then, the correction circuit 113 obtains the coefficient from the data for obtaining the coefficients, and corrects the detection result of the magnetic sensor 111 based on the coefficient obtained, the relational expression, and the detection result of the disturbance magnetic flux detection circuit 112.

Since it is possible to obtain the rotational angle error with respect to the disturbance magnetic flux from the coefficient obtained and the relational expression, it is not necessary to store the data indicating the relationship between the disturbance magnetic flux and the rotational angle error for all of the disturbance magnetic flux in the disturbance magnetic flux regions that may be applied.

Therefore, it is possible to suppress the rotational angle error caused by the disturbance magnetic flux being applied from occurring while reducing the volume of data to be stored.

As a result, it is possible to configure a device with a small storage region.

In addition, it is possible to reduce time and effort required to prepare the data.

According to the first embodiment, the relationship between the disturbance magnetic flux and the rotational angle error is represented by the single linear expression.

The correction circuit 113 stores the data for obtaining the coefficients of the linear expression in every rotational angle.

Then, the coefficient is obtained from the data for obtaining the coefficients, and the correction circuit 113 corrects the detection result of the magnetic sensor 111 based on the linear expression obtained by substituting the obtained coefficient, and the detection result of the disturbance magnetic flux detection circuit 112.

Therefore, when the relationship between the disturbance magnetic flux and the rotational angle error is represented by the single linear expression, it is possible to suppress the rotational angle error caused by the disturbance magnetic flux being applied from occurring while reducing the volume of data to be stored.

According to the first embodiment, the coefficient of the relational expression is the slope and the intercept.

Thereby, it is possible to reliably obtain the relationship between the disturbance magnetic flux and the rotational angle error represented by the single linear expression.

Therefore, it is possible to reliably obtain the rotational angle error with respect to the disturbance magnetic flux from the coefficient obtained and the relational expression.

According to the first embodiment, the data for obtaining the coefficient of the relational expression are data of two disturbance magnetic fluxes that are different to each other, and data of two rotational angle errors with respect to the disturbance magnetic fluxes.

Therefore, it is possible to obtain the coefficient of the relational expression represented by the single linear expression reliably.

According to the first embodiment, data for obtaining the coefficients are obtained beforehand by at least either one of the experiments and simulations.

Therefore, it is possible to accurately obtain the rotational angle error with respect to the disturbance magnetic flux from the coefficient obtained and the relational expression.

According to the first embodiment, a rotating body subject to be detected by the rotational angle detecting device 11 is the motor 10 having the field winding 102c.

Therefore, when the current flows through the field winding 102c, the current leaks to outside the motor 10 and may be applied to the magnetic sensor 111.

The disturbance magnetic flux detection circuit 112 detects the leaked magnetic flux leaking to outside the motor 10 as the disturbance magnetic flux among the magnetic flux generated by the current flowing through the field winding 102c.

Therefore, it is possible to reliably detect the disturbance magnetic flux that interlinks to the magnetic sensor 111.

According to the first embodiment, the disturbance magnetic flux detection circuit 112 includes the current sensor 112a.

The current sensor 112a is the element that detects the current flowing through the field winding 102c that has a corresponding relationship with the disturbance magnetic flux.

Therefore, it is possible to reliably detect the disturbance magnetic flux.

According to the first embodiment, the field winding 102c is wound around the rotor core 102b that rotates together with the rotational shaft 102a.

Therefore, more magnetic flux may leak from the end of the rotational shaft 102a in the magnet 110 side.

In other words, more disturbance magnetic flux is likely to occur.

However, it is possible to correct the detection result of the magnetic sensor 111 based on the disturbance magnetic flux.

Therefore, even in a configuration that more disturbance magnetic flux is applied to the magnetic sensor 111, it is possible to suppress the rotational angle error from occurring reliably.

Note that although an example that the correction circuit 113 stores the data for obtaining the coefficient of the relational expression indicating the relationship between the disturbance magnetic flux and the rotational angle error in every rotational angle is shown in the first embodiment, it is not limited thereto.

At least either one of the data for obtaining the coefficients of the relational expression and the data of coefficient may be stored for every rotational angle.

When the data (I1, Δθ1) or (I2, Δθ2), and the slope a1 shown in FIG. 2 are stored, the intercept b1 can be obtained from them.

When the data (I1, Δθ1) or (I2, Δθ2), and the intercept b1 are stored, the slope a1 can be obtained from them.

When the slope a1 and the intercept b1 are stored, it becomes unnecessary to obtain them, and thus it is possible to reduce the load of the arithmetic processing in the correction circuit 113.

Although an example where the disturbance magnetic flux detection circuit 112 detects the current flowing through the field winding 102c that has the corresponding relationship with the disturbance magnetic flux is shown in the first embodiment, it is not limited thereto.

A flux excluding the magnetic flux and the disturbance magnetic flux that interlinks to the magnetic sensor 111 may be detected directly.

Moreover, it is also possible to detect other physical quantity having a corresponding relationship with the disturbance magnetic flux.

Second Embodiment

Next, a motor drive system of a second embodiment will be described.

In contrast to the motor drive system of the first embodiment that the relationship between the disturbance magnetic flux and the rotational angle error is represented by the single linear expression, the motor drive system of the second embodiment corresponds to a case where the relationship is represented by two linear expressions defined for each region.

First, a configuration of the motor drive system according to the second embodiment will be described.

The configuration of the motor drive system is the same as the motor drive system of the first embodiment except that an operation of the correction circuit is different.

Therefore, a configuration of a correction circuit in the motor drive system of the second embodiment will be described with reference to FIG. 5 together with referring to the circuit diagram of the motor drive system of the first embodiment in FIG. 1.

The correction circuit 113 shown in FIG. 1 is the circuit for correcting the detection result of the magnetic sensor 111 based on the detection result of the disturbance magnetic flux detection circuit 112.

Specifically, the correction circuit 113 stores the data for obtaining the coefficient of the relational expression indicating the relationships between the disturbance magnetic flux and the rotational angle error for every rotational angle in the case where the relationship of the disturbance magnetic flux and the rotational angle error is represented by two linear expressions defined for each region.

In addition, the correction circuit 113 is the circuit for correcting the detection result of the magnetic sensor 111 based on the coefficient data obtained from the data for obtaining the coefficients, the relational expression, and the detection result of the disturbance magnetic flux detection circuit 112.

Figure 5:
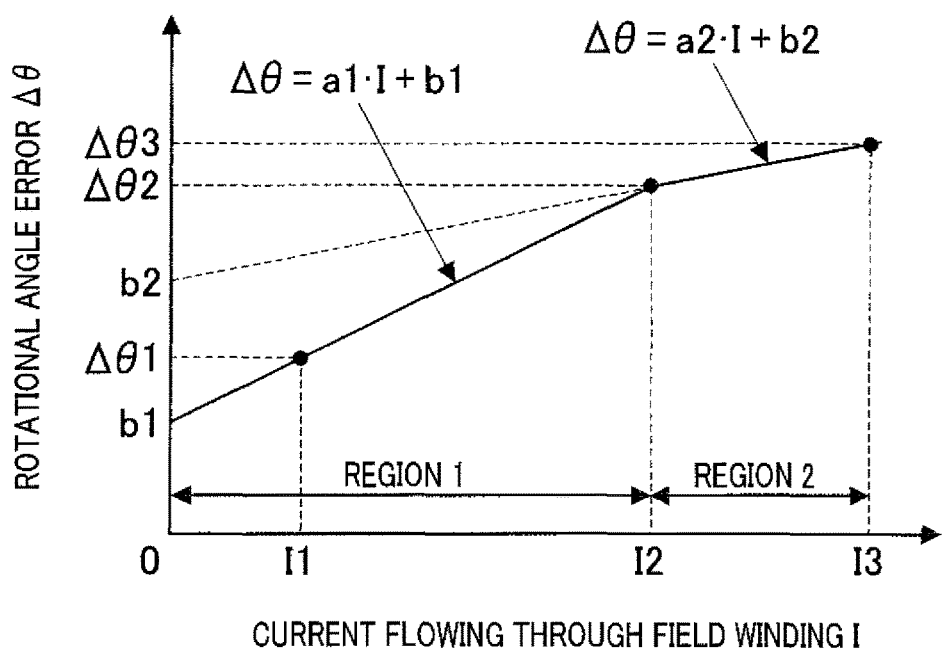
FIG. 5 shows an explanatory graph for explaining a relationship between a current flowing through a field winding and a rotational angle error in a second embodiment.

As shown in FIG. 5, when the relationship between the current I flowing through the field winding 102c that has a corresponding relationship with the disturbance magnetic flux and the rotational angle error Δθ is represented by Δθ=a2·I+b2 in a region 2 where the current flowing through the winding 102c is greater than in the region 1 at the linear expression Δθ=a1·I+b1 in the region 1 as a reference, the correction circuit 113 stores two sets of data (I1, Δθ1) and (I2, Δθ2) in the region 1 for obtaining the slopes a1, a2 and the intercept b1 that are the coefficients of the linear expression, and 2 sets of data (I2, Δθ2) and (I3, Δθ3) in the region 2 for every rotational angle.

The data (I2, Δθ2) is a data at a boundary of the region 1 and region 2.

Therefore, as a result, three sets of data (I1, Δθ1), (I2, Δθ2) and (I3, Δθ3) for obtaining the slopes a1, a2 and the intercept b1 that are coefficients of the linear expression are stored for every rotational angle.

Here, the data (I1, Δθ1), (I2, Δθ2), and (I3, Δθ3) are the currents I1, I2, I3 different to each other flowing into the field winding 102c, and the rotational angle errors Δθ1, Δθ2, and Δθ3 against the current I1, I2, I3 in each region.

The data (I1, Δθ1), (I2, Δθ2) and (I3, Δθ3) are obtained by at least either one of the experiments and simulations.

The correction circuit 113 obtains the slope a1 and the intercept b1 from the data (I1, Δθ1) and (I2, Δθ2) for obtaining the coefficients of the linear expression in the region 1.

Further, the correction circuit 113 obtains the slope a2 from the data (I2, Δθ2) and (I3, Δθ3) for obtaining the coefficients of the linear expression in the region 2.

A straight line represented by the linear expression in the region 2 is connected to a straight line represented by the linear expression in the region 1 at the boundary of the region 1 and region 2.

Therefore, it is not always necessary to obtain the intercept b2 of the linear expression in the region 2.

The correction circuit 113 corrects the detection result of the magnetic sensors 111 based on the linear expression in the region 1 obtained by substituting the obtained slope a1 and the intercept b1, the linear expression in the region 2 obtained by substituting the obtained slope a2 of the linear expression, and the current flowing to the field winding 102c detected by the current sensor 112a.

As shown in FIG. 1, the correction circuit 113 includes the storage circuit 113a, the correction amount calculating circuit 113b, and the correction processing circuit 113c.

The storage circuit 113a is a circuit that stores the slope and the intercept of the linear expression in the region 1 shown in FIG. 5, and the three sets of data for obtaining the slope of the linear expression in region 2 in every rotational angle.

The correction amount calculating circuit 113b shown in FIG. 1 is a circuit that obtains the slope and the intercept of the linear expression in the region 1 and the slope of the linear expression in the region 2 based on the slope and the intercept of the linear expression in the region 1 and the three sets of data for obtaining the slope of the linear expression in region 2 in every rotational angle stored in the storage circuit 113a.

Furthermore, the correction amount calculating circuit 113b is a circuit that obtains the rotational angle error from the linear expression in the region 1 obtained by substituting the slope and the intercept that are obtained, the linear expression in the region 2 obtained by substituting the slope that is obtained, and the current flowing in the field winding 102c detected by the current sensor 112a, and calculates the correction amount for eliminating the rotational angle error.

The correction processing circuit 113c is a circuit that corrects the detection result of the magnetic sensor 111 based on a calculation result of the correction amount calculating circuit 113b, and outputs to the motor drive device 12 as a rotational angle of the rotational shaft 102a.

Next, operations of the motor drive system of the second embodiment will be described.

The operations of the motor drive system in the second embodiment are identical to those of the motor drive system in the first embodiment except for the operation of the correction circuit.

Therefore, the operations of the correction circuit of the motor drive system in the second embodiment will be described with reference to FIGS. 1 and 5.

The current sensor 112a shown in FIG. 1 detects the current flowing through the field winding 102c of the motor 10.

The correction amount calculating circuit 113b is the circuit that obtains the slope and the intercept of the linear expression in the region 1 and the slope of the linear expression in the region 2 from the slope and the intercept of the linear expression in the region 1 shown in FIG. 5 and the three sets of data for obtaining the slope of the linear expression in region 2 that are stored in the storage circuit 113a in every rotational angle.

Then, the correction amount calculating circuit 113b obtains the rotational angle error from the linear expression in the region 1 obtained by substituting the slope and the intercept that are obtained, the linear expression in the region 2 obtained by substituting the slope that is obtained, and the current flowing in the field winding 102c detected by the current sensor 112a, and calculates the correction amount for eliminating the rotational angle error.

The correction processing circuit 113c shown in FIG. 1 corrects the detection result of the magnetic sensor 111 based on a calculation result of the correction amount calculating circuit 113b, and outputs it to the motor drive device 12 as a rotational angle of the rotational shaft 102a.

As a result, it is possible to make the rotational angle error almost zero.

Next, effects of the motor drive system in the second embodiment will be described.

According to the second embodiment, by having the same configuration as the first embodiment, it is possible to obtain the same effect as the first embodiment corresponding to the same configuration.

According to the second embodiment, the relationship between the disturbance magnetic flux and the rotational angle error is represented by two linear expressions that are defined for each region.

The correction circuit 113 stores the data for obtaining the coefficients of the two linear expressions in every rotational angle.

Then, the coefficients are obtained from the data for obtaining the coefficients, and the correction circuit 113 corrects the detection result of the magnetic sensor 111 based on the two linear expressions obtained by substituting the obtained coefficients, and the detection result of the disturbance magnetic flux detection circuit 112.

Therefore, when the relationship between the disturbance magnetic flux and the rotational angle error is represented by the two linear expression that are defined for each region, it is possible to suppress the rotational angle error caused by the disturbance magnetic flux being applied from occurring while reducing the volume of data to be stored.

According to the second embodiment, the coefficients of the relational expression are the slope and the intercept of the linear expression in the region 1 as a reference, and the slope of the linear expression in the other region 2 excluding the region as the reference.

Thereby, it is possible to reliably obtain the relationship between the disturbance magnetic flux and the rotational angle error represented by the two linear expressions.

Therefore, it is possible to reliably obtain the rotational angle error with respect to the disturbance magnetic flux from the coefficient obtained and the relational expression.

According to the second embodiment, the data for obtaining the coefficient of the relational expression are data of two disturbance magnetic fluxes that are different to each other in each region, and data of two rotational angle errors with respect to the disturbance magnetic fluxes.

Therefore, it is possible to obtain the coefficient of the relational expression represented by the two linear expressions reliably.

Note that although an example that the correction circuit 113 stores the data for obtaining the coefficient of the relational expression indicating the relationship between the disturbance magnetic flux and the rotational angle error in every rotational angle is shown in the second embodiment, it is not limited thereto.

At least either one of the data for obtaining the coefficients of the relational expression and the data of coefficient defined for each region may be stored for every rotational angle.

When the data (I1, Δθ1) or (I2, Δθ2), and the slope a1 shown in FIG. 5 are stored, the intercept b1 can be obtained from them.

When the data (I1, Δθ1) or (I2, Δθ2), and the intercept b1 are stored, the slope a1 can be obtained from them.

When the slope a1 and the intercept b1 are stored, it becomes unnecessary to obtain them, and thus it is possible to reduce the load of the arithmetic processing in the correction circuit 113.

As for the data for obtaining the coefficients of the linear expression in the region 2, a ratio of the slope of the linear expression in the region 2 to the slope of the linear expression in the region 1 may be stored for every rotational angle.

Accordingly, it is possible to reduce the volume of data as compared with a case of obtaining the slope a2 of the linear expression in the region 2 from the data (I2, Δθ2) and (I3, Δθ3).

Although an example that the relationship between the disturbance magnetic flux and the rotational angle error is represented by two linear expressions that are defined for each region in the second embodiment, it is not limited thereto.

A case where the relationship between the disturbance magnetic flux and the rotational angle error is represented by three or more linear expressions that are defined for each region can also be applied.

Moreover, a case where the relationship between the disturbance magnetic flux and the rotational angle error is represented by any relationship can be applied.

In such a case, the correction circuit 113 stores at least either one of the data for obtaining the coefficients of the relational expression indicating the relationship between the disturbance magnetic flux and the rotational angle error, and the data of the coefficients, and it is sufficient to correct the detection result of the magnetic sensor based on at least either one of the data of the coefficients obtained from the data for obtaining the coefficients and the data of the coefficient stored, the relational expression, and the detection result of the disturbance magnetic flux detection circuit.

What is claimed is:

1. A rotational angle detecting device comprising:
a magnet, disposed on a rotational shaft of a rotating body, which rotates together with the rotational shaft to generate a magnetic flux;

a magnetic sensor disposed at a distance from the magnet for detecting the magnetic flux that interlinks with the magnetic sensor;

a disturbance magnetic flux detection circuit that detects a disturbance magnetic flux, which is a flux excluding a magnetic flux generated by the magnet, the disturbance magnetic flux interlinking with the magnetic sensor; and a correction circuit that corrects a detection result of the magnetic sensor based on a detection result of the disturbance magnetic flux detection circuit, wherein the correction circuit stores at least either one of data for obtaining coefficients of a relational expression indicating a relationship between the disturbance magnetic flux and a rotational angle error, and a data of the coefficients of the relational expression, and the correction circuit corrects the detection result of the magnetic sensor based on at least either one of the data of the coefficients obtained from the data for obtaining the coefficients and the data of the coefficient stored, the relational expression, and the detection result of the disturbance magnetic flux detection circuit.

2. The rotational angle detecting device according to claim 1, wherein when the relationship between the disturbance magnetic flux and the rotational angle error is represented by a single linear expression, the correction circuit stores at least either one of the data for obtaining the coefficients of the linear expression and the data of the coefficients, and the correction circuit corrects the detection result of the magnetic sensor based on the linear expression obtained by at least either one of the data of the coefficients obtained from the data for obtaining the coefficients and the stored data of the coefficients, and the detection result of the disturbance magnetic flux detection circuit.

3. The rotational angle detecting device according to claim 2, wherein the coefficients are a slope and an intercept.

4. The rotational angle detecting device according to claim 3, wherein the data for obtaining the coefficients of the relational expression are data of two disturbance magnetic fluxes that are different to each other, and data of two rotational angle errors with respect to the disturbance magnetic fluxes.

5. The rotational angle detecting device according to claim 1, wherein when the relationship between the disturbance magnetic flux and the rotational angle error is represented by a plurality of linear expressions defined for each region, the correction circuit stores at least either one of the data for obtaining the coefficients of the plurality of linear expressions and the data of the coefficients, and the correction circuit corrects the detection result of the magnetic sensor based on the plurality of linear expressions obtained by at least either one of the data of the coefficients obtained from the data for obtaining the coefficients and the data of the coefficient stored, and the detection result of the disturbance magnetic flux detection circuit.

6. The rotational angle detecting device according to claim 5, wherein the coefficients are the slope and the intercept of the linear expression in the region as a reference, and the slope of the linear expression in another region excluding the region as the reference.

7. The rotational angle detecting device according to claim 6, wherein the data for obtaining the coefficients are data of two disturbance magnetic fluxes that are different to each other in each region, and data of two rotational angle errors with respect to the disturbance magnetic fluxes.

8. The rotational angle detecting device according to claim 6, wherein data for obtaining the coefficients in the other region is a ratio of the slope of the linear expression in the other region relative to the slope of the linear expression in the region as the reference.

9. The rotational angle detecting device according to claim 1, wherein the data for obtaining the coefficient and the data of the coefficient are obtained beforehand by at least either one of experiments and simulations.

10. The rotational angle detecting device according to claim 1, wherein the rotating body is a motor having a field winding, and the disturbance magnetic flux detection circuit detects a leaked magnetic flux leaking to outside the motor as a disturbance magnetic flux among the magnetic flux generated by a current flowing through the field winding.

11. The rotational angle detecting device according to claim 10, wherein the disturbance magnetic flux detection circuit has a current sensor for detecting the current flowing through the field winding.

12. The rotational angle detecting device according to claim 10, wherein the field winding is disposed on a rotor core that rotates together with the rotational shaft.

* * * * *